United States Patent [19]

Wolf

[11] 4,058,330
[45] Nov. 15, 1977

[54] COUPLING ARRANGEMENT

[76] Inventor: Franz-Josef Wolf, D-6483 Bad Soden-Salmunster, Sprudelallee 19, Germany

[21] Appl. No.: 675,962

[22] Filed: Apr. 12, 1976

[30] Foreign Application Priority Data

May 3, 1975 Germany .......................... 7514275
Nov. 19, 1975 Germany .......................... 2551939

[51] Int. Cl.² .......................................... F16L 55/00
[52] U.S. Cl. .................................... 285/174; 138/89; 285/406; 285/423
[58] Field of Search ............... 285/242, 255, DIG. 22, 285/93, 423, 260, 319, 250, 245, 246, 247, 239, 240, 241, 174, 315, 406; 138/89, 119, 177; 222/DIG. 8, DIG. 11

[56] References Cited

U.S. PATENT DOCUMENTS

| 550,267 | 11/1895 | Gold | 285/242 X |
| 2,290,776 | 7/1942 | Stillwagon | 285/242 X |
| 3,300,163 | 1/1967 | Randolph | 285/243 X |
| 3,574,312 | 4/1971 | Miller | 138/89 X |
| 3,814,135 | 6/1974 | Hetzer et al. | 138/89 X |
| 3,853,338 | 12/1974 | Wilson | 285/342 X |

FOREIGN PATENT DOCUMENTS 376,732  5/1964  Switzerland ................. 285/DIG. 22

Primary Examiner—Dave W. Arola
Attorney, Agent, or Firm—Webb, Burden, Robinson & Webb

[57] ABSTRACT

An arrangement for coupling an elastic structural member to an inherently stable structural rigid member by means of a fastening element. The elastic member has a flexurally elastic flange and the rigid member has a bend-resistant flange, the flanges being adapted to be joined to one another. An edge of the flexurally elastic flange projects beyond an edge of the bend-resistant flange and carries a bulge thereon. The fastening element has a flange and a skirt and is adapted to be pushed axially from the direction of the elastic member over the flanges of the elastic and rigid structural members when they are in abutment so as to complete the coupling arrangement. The fastening element may be designed as an external ring or as a plug or button member for internal assembly.

7 Claims, 4 Drawing Figures

COUPLING ARRANGEMENT

This invention relates to an arrangement for coupling an elastic component part with an inherently stable component part by employing a connecting element.

When an elastic member and a rigid member are to be coupled to one another and when this coupling is not exposed to any rather great pressure loads or safety requirements under operational conditions, then the two component parts are generally secured to one another by exploiting the elasticity of the elastic member which is stretched over the rigid member or is secured therein in the manner of a button. However, if operating conditions demand that such couplings must withstand greater pressure loads, then additional securing or attachment members will be necessary. For internal securement riveted or bolted connections are used together with counterplates, and for external fastening clamping rings of the most varied designs are used. Common to all of these known fastening means is the fact that they require great expenditures for assembling them and thereby become relatively expensive even when the fastening means itself, as for instance in a rivet connection, is relatively inexpensive. Moreover, in bolted connections or the majority of clamping ring connections the fastening member itself is relatively expensive. In many areas of assembly line production and mass production the cost factor of assembling is an extremely important one. Particularly in the automobile industry it is of decisive importance.

In view of this state of technological development, it is the aim of the invention to create an arrangement for coupling an elastic member, more particularly a rubber-elastic hollow body, to an inherently stable, bend resistant member by means of a fastening element, an arrangement which makes it possible with simple and inexpensive means through simple and inexpensive assembling to produce a connection of the type mentioned which is not susceptible to the forces of pressure, tension, and shearing.

To achieve this aim an arrangement of the mentioned type is proposed which has the characteristics set forth in the following description and the appended claims.

The arrangement makes it possible to make the connection between the two component parts by simply pushing the fastening member, which usually is in the shape of a ring or a plug, over the two abutting flanges from the direction of the flexible flange. This fastening may be performed in less than one second and requires a rectilinear exertion of force. Such measures may be carried out completely, automatically, in the simplest and cheapest way, but they may just as simply be carried out by hand with the aid of a clamping tool or a spreader. The couplings obtained in this way are so tight that in pressure tests the flexible component member first tore or ruptured without having the coupling become disengaged or leak. This is attributable to the fact that the arrangement of the invention is self-sealing and self-locking both when a tensile load or inner pressure is applied, and when a compressive or bearing pressure is applied.

The invention is preferably used for securing hollow molded bodies made of rubber, such as hoses or bellows, to rigid component members, such as base plates, mounting plates, pipe nipples or plug-shaped holding devices. The securing or fastening element, which is preferably made of a synthetic material, such as plastic, may be designed as an external ring like a sleeve or an unthreaded retaining nut or as a plug or button member for internal assembly. The plug may be designed as an open cylindrical ring or as closed on one side.

According to a further embodiment of the invention the end bulge of the flexurally elastic or rubber-elastic flange is preferably so designed that it will rebound, that is, point toward the elastic member and point away from the stiff member. When the elastic edge of the flange that is provided with such a bulge is turned upside down, the said bulge is so deformed by having the fastening member pushed over it that oppositely to its design in the relaxed state it is pressed backwardly under the flange of the inherently stable member. The rubber-elastic tensions produced thereby in the flexurally elastic flange impart extraordinary strength to the coupling.

Preferably, this arrangement is used chiefly in the automobile industry. Thus, for example, by simply inserting the plug like a button into a rubber bellows with a bottom opening and having the buttoned-in plug emerge through a mounting aperture, a foot pump for the windshield washer may be secured in a floor plate or on a mounting plate. Radiator hoses may be connected in absolutely tight manner to the connecting nipples by simply pressing them on in less than one second. Here it is not even necessary to pull the end of the hose over the nipple, as is usually done. The two flanges need only merely to be placed against one another and the fastening member need only be pressed over them.

However, the elastic component part need not always be a hollow body. The elastic flanges may also be molded onto solid rubber cords. Such solid rubber cords, preferably with a circular cross section, may then also be attached to the front face of suitable holding plugs effortlessly and securely by the arrangement of the invention. Such elements serve as buffer and spring elements for axially taking up pressure stress and tensile stress.

The invention will now be more fully described in connection with the accompanying drawings, with the aid of exemplifying embodiments, in which.

Figure 1:
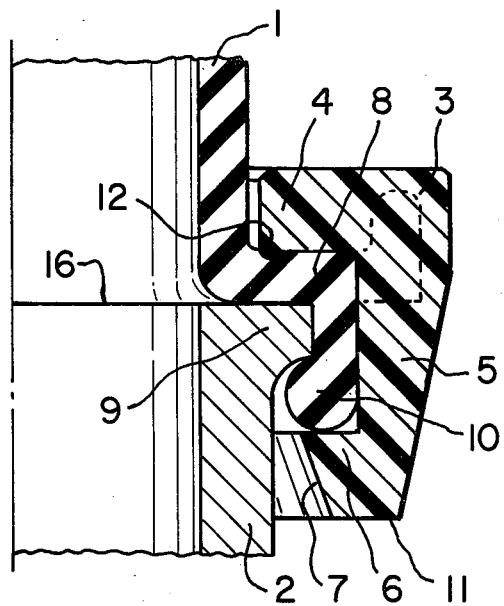
FIG. 1 is an axial section through an exemplifying embodiment of the invention with external fastening means shown in the assembled condition.

FIG. 1 shows a rubber nipple 1, for instance the end of a hose, secured to a pipe nipple 2 in the assembled position. The pipe nipple may, for instance, be made of metal, a mineral material, or a rigid plastic material. A fastening means or fastening element 3 encompasses the junction between hose nipple 1 and pipe nipple 2 from without. Fastening element 3 is basically in the shape of a cylindrical circular ring, and in the manner of a retaining nut has a flange 4, and a skirt 5 at right angles thereto. The edge of skirt 5 opposite flange 4 is provided radially with an annular nose 6 on the side facing flange 4, nose 6 acting as a stop to prevent fastening element 3 from being stripped off accidentally. A coneshaped bevel 7 under nose 6 makes it easier to push fastening element 3 over the joint.

Hose nipple 1 terminates in a flexurally elastic flange 8 projecting radially outwardly which, when the coupling is assembled, abuts against a bend-resistant radially outwardly projecting annular flange 9 of pipe nipple 2. The outer edge or terminal end of flexurally elastic flange 8 has a resilient bulge 10 which in the relaxed condition points away from pipe nipple 2. In FIG. 1 the relaxed state of flexurally resilient flange 8 and bulge 10 is shown in dotted lines. During assembling, fastening element 3 is pressed downwardly from above in the representation shown in FIG. 1. In so doing the lower face 11 of fastening element 3 sits on the annular bulge and while being pressed farther downwardly, it inverts the bulge around the outer edge of unbendable flange 9. Conical or inclined surface 7 glides over bulge 10 and the inverted portions of flexible flange 8 until finally the protruding edge of flexible flange 8 is inverted around unbendable flange 9 and bulge 10 is forced under the flange. Skirt 5 clamps the flange and bulge 10 snugly toward onto and under unbendable flange 9, the unbendable or bend-resistant flange 9 being captured between the bulge and the non-inverted portion of the elastic flange as shown in FIG. 1. The downward movement of fastening element 3 is limited by its flange 4 which rests on the non-inverted portion of flexible flange 8. In this connection, flange 4 of fastening element 3 may also be provided with an annular bulge 12 which is pressed into the top side of flexible flange 8, thereby forming an additional sealing member.

As the result of the edge-seal effected at the outer edges of the unbendable flange 9 of pipe nipple 2 in cooperation with inverted flexible flange 8, the coupling shown in FIG. 1 is absolutely tight against fluids and gases. When a pull is applied in the axial direction between hose nipple 1 and pipe nipple 2, the sealing force of this edge-seal is substantially increased even further. The edge-seal is almost unaffected by the occurrence of tangential stresses between hose nipple 1 and pipe nipple 2, while the surface seal between the underside of flexible flange 8 and the topside of unbendable flange 9 is increased.

Nose 6 serves as a safety device to prevent the fastening element from being stripped off accidentally. When there is no danger of this, for instance, because in the provided assembly design a force is already applied to the fastening member in the locking direction, then, of course, nose 6 need not be provided. When it is provided, as shown in FIG. 1, if fastening element 3 is of a rigid construction, the nose may be so proportioned that it can be slipped over flexible flange 8 and bulge 10 due to their elastic deformation. On the other hand, if the nose is designed so as to project relatively far, and if the material of flange 8 and bulge 10 is only slightly compressible, then the fastening element 3 must be of resilient construction at least in the vicinity of the nose. This may be done quite simply by slitting the bottom edge of the skirt, which makes the nose resilient. On the other hand, the fastening element 3 may, for example, be made of hard rubber and have a certain material elasticity which will permit fastening element 3 to be pressed effortlessly over the junction point.

Figure 2:
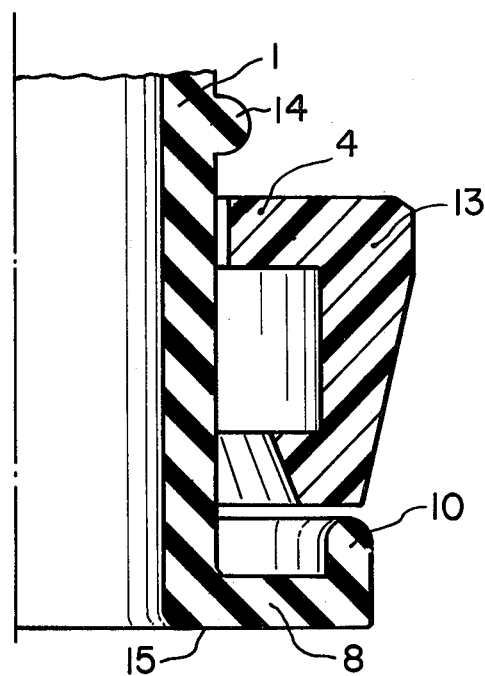
FIG. 2 is an axial section through an exemplifying embodiment of the type shown in FIG. 1, prior to assembly.

Rubber nipple 1 which was shown in the assembled condition in FIG. 1 is shown in the relaxed state in FIG. 2 prior to assembling. The fastening element 13 is basically like fastening element 3 shown in FIG. 1, but without sealing bulge 12. Depending upon the design of the nipple 1, the fastening element 13 may be drawn over hose nipple 1 either from the direction of flexible flange 8 or from the opposite direction. In practice it will be the rule that nipple 1, for instance the end of a cooling water hose, is made available to the supplier of the consumer, such as an automobile plant, in the preassembled state shown in FIG. 2, with fastening element 13 drawn thereover. In order to prevent fastening element 13 from accidentally being pushed too far away from flange 8, the axial movability of fastening element 13 is preferably limited by an annular bulge 14 formed on the hose. All that is required for making the connection shown in FIG. 1 is to place the lower surface 15 of flange 8 on top of the upper surface 16 of unbendable flange 9 and to press fastening element 13 as shown in FIG. 2 downwardly.

Figure 3:
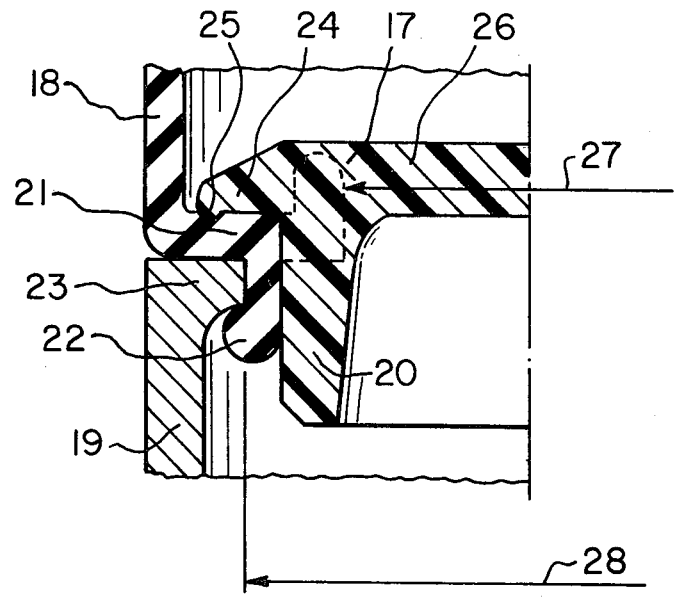
FIG. 3 is an axial section through another exemplifying embodiment of the invention with internal fastening means and a closed plug design.

FIG. 3 shows another exemplifying embodiment of the coupling arrangement of the invention. In contrast to the previously described exemplifying embodiment, fastening element 17 does not encompass the junction between elastic member 18 and rigid member 19 from without, but rather is pressed from the direction or side of elastic member 18 through the plane of the junction in the manner of a plug or stopper. Skirt 20 of plug-shaped fastening element 17 inverts elastic flange 21 and bulge 22 and presses them outwardly around inwardly projecting flange 23. In FIG. 3 radially inwardly projecting elastic flange 21 with its bulge 22 is indicated in dotted lines in its relaxed state. On its outer edge or terminal end radially outwardly projecting flange 24 is provided with sealing bulge 25 and extends radially inwardly into a plate 26 which is made in one piece with flange 24 and skirt 20, so that the interior of elastic member is hermetically sealed off by the edge-seal of bulge 25 and the surface seal between flexible flange 21 and the outside of skirt 20.

The embodiment of the invention shown in FIG. 3 is preferably used for attaching a foot-bellows-pump (to be known hereinafter as "foot-pump" for the sake of brevity) for the windshield washing device of an automobile to a support or base. Elastic member 18 is the bottom edge of the pump bellows which is made of rubber. Inherently stable or rigid member 19 is an opening in a base plate or mounting plate. For the purpose of securing pump bellows elastic member 18 to mounting plate member 19, fastening element 17 is inserted like a button into opening 27 of bellows member 18 (from below in the showing of FIG. 3). Thereupon opening 27 is placed concentrically over opening 28 in mounting plate 19 and secured by downwardly directed pressure. This results in the assembly of the individual components as shown in FIG. 3.

When the coupling arrangement shown in FIG. 3 is used in the previously described manner for securing a foot pump to a mounting plate, skirt 20 does not need a nose 6 (as in FIGS. 1 and 2). When the pump is being operated, a downwardly directed force is exerted on bellows member 18 which presses plug or fastening element 17 downwardly either directly or after the medium contained in the body of the bellows has been transferred.

As the result of this exertion of force the sealing effect of sealing bulge 25 is enhanced at the same time. In this connection bulge 22 is forced toward and under rigid flange 23 by the outside wall of skirt 20 the flange 23 being captured between the bulge and the non-inverted portion of flange 21, so that bellows member 18 is held in opening 28 of mounting plate 19 fully protected against shearing forces and tensile forces.

Figure 4:
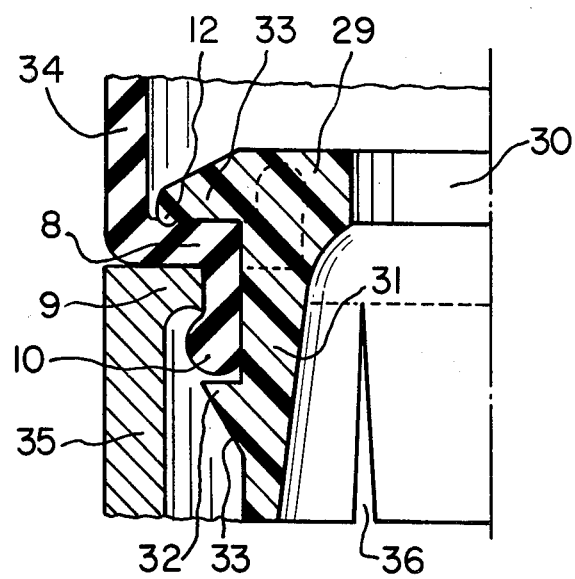
FIG. 4 is an axial section through a modified exemplifying embodiment of the type shown in FIG. 3 with an open fastening element.

A third exemplifying embodiment of the design of the invention is shown in FIG. 4. This embodiment corresponds basically to the embodiment shown in FIG. 3 and differs therefrom in the fact that fastening element 29 designed as a plug is not closed, but is made with a central opening 30. Skirt 31 of fastening element 29 has a radially outwardly projecting peripheral nose 32 which serves to lock fastening element 29 in position. Conical inclined surface 33 makes it easier to press in fastening element 29. Whereas the nose 6 shown in the embodiment of FIG. 1 projects radially inwardly, the nose 32 shown in the embodiment of FIG. 4 projects radially outwardly. In both cases, however, the direction in which the nose projects is the same as the one in which flange 4 protrudes beyond skirt 5 in FIG. 1 and the flange 33 protrudes beyond skirt 31 in FIG. 4.

In the embodiment shown in FIG. 4 fastening element 29 is made of a non-compressible material, for example, of a relatively brittle synthetic material, i.e. plastic. In order to facilitate making the connection between elastic member 34 and inherently stable or rigid member 35 by pushing in (downwardly in the showing of FIG. 4) open plug or fastening element 29 which carries locking bulge or nose 32, the plug is provided in its bottom portion with slits 36 which allow locking noses 32 to give way resiliently when fastening element 29 is pressed in axially.

The exemplifying embodiment shown in FIG. 4 may, for instance, serve for securing a hose nipple or hose to a pipe nipple whenever for structurally technical reasons or also for esthetic reasons an external fastening device as shown in FIG. 1 is not possible or not desired. Then in spite of the internal attachment of fastening element 29, the opening 30 therein guarantees free communication between the interior areas of the two component members 34 and 35 that have been connected to one another.

The embodiment of the coupling arrangement shown in FIG. 4 is a particularly economical one when, for example, a throttle diaphragm or filter is to be installed in a pipe section consisting of a rigid piece of piping and a piece of hose. Opening 30 may then be designed with the diameter required for throttling or may be filled with a filter block. The construction of the fastening element 29 shown in FIG. 4 in the above described manner as a filter is preferably used for securing heater hoses in automotive vehicles. In this construction of fastening element 24 nose 32 preferably does not run all the way around, but is instead developed only on two or three smaller sections of the arc of the circle, so that the locking may be readily terminated in a well known manner and for purposes of changing them the fastening and filtering element may be pushed back in a simple manner into the interior of component member 34 in order to disengage the coupling.

I claim:

1. An arrangement for coupling an elastic structural member to an inherently stable structural rigid member by means of a fastening element, said arrangement comprising an elastic member having an end terminating in a flexurally elastic flange and a rigid member having a bend-resistant flange, the flanges being adapted to be joined to one another, an edge of the flexurally elastic flange of the elastic structural member projecting beyond an edge of the bend-resistant flange of the rigid structural member and carrying a bulge thereon at the terminal end thereof, and a fastening element having a flange and a skirt and adapted to be pushed axially from the direction of the elastic member over the flanges of the elastic and the rigid structural members when they are in abutment in such a way that a bottom face of the skirt inverts the projecting edge of the flexurally elastic flange with its bulge which faces away from the direction in which the fastening element is pushed around the edge of the bend-resistant flange and the skirt forces the inverted bulge beyond the bend-resistant flange and toward said rigid member so that said bend-resistant flange is captured between said bulge and non-inverted portion of the elastic flange while the flange of the fastening element rests on the non-inverted portion of the flexurally elastic flange.

2. An arrangement according to claim 1 wherein the flanges of the elastic and rigid structural members are internally disposed annular flanges and the fastening element is either an open plug or a closed plug.

3. An arrangement according to claim 1 wherein the flexurally elastic flange and the bend-resistant flange are externally disposed annular flanges and the fastening element comprises a member designed in the manner of a retaining nut.

4. An arrangement according to claim 2 wherein the plug is a closed plug and the elastic structural member forms a part of a closed pump bellows.

5. An arrangement according to claim 1 wherein the flexurally elastic flange and the bend-resistant flange are externally disposed annular flanges and the fastening element comprises a member designed in the manner of a retaining nut.

6. An arrangement according to claim 1 wherein the fastening element is made of a synthetic material and of hard rubber.

7. An arrangement according to claim 1 wherein the synthetic material comprises a plastic material.

* * * * *